United States Patent [19]

Iwata

[11] Patent Number: 4,889,014

[45] Date of Patent: Dec. 26, 1989

[54] SYSTEM FOR CONTROLLING AN INTERNAL COMBUSTION ENGINE FOR MOTOR VEHICLES EQUIPPED WITH AN AUTOMATIC TRANSMISSION

[75] Inventor: Takahiro Iwata, Saitama, Japan

[73] Assignee: Honda Giken Kogyo Kabushiki Kaisha, Tokyo, Japan

[21] Appl. No.: 290,302

[22] Filed: Dec. 23, 1988

[30] Foreign Application Priority Data

Dec. 29, 1987 [JP] Japan ................................ 62-336668
Dec. 29, 1987 [JP] Japan ................................ 62-336669

[51] Int. Cl.$^4$ ............................................. B60K 41/18
[52] U.S. Cl. ......................................... 74/858; 74/859
[58] Field of Search .......................... 74/857, 858, 859; 364/431–507

[56] References Cited

U.S. PATENT DOCUMENTS 4,493,228  1/1985  Vukovich et al. ..................... 74/858
4,688,450  8/1987  Hayashi et al. ................... 74/858 X
4,724,723  2/1988  Lockhart et al. ................. 74/858 X
4,819,163  4/1989  Shimizu et al. ................... 74/858 X Primary Examiner—Dirk Wright
Attorney, Agent, or Firm—Lyon & Lyon

[57] ABSTRACT

A system for controlling an internal combustion engine for motor vehicles equipped with an automatic transmission. In the system, engine torque is calculated from an engine speed and an engine load. Similarly, transmissible torque of the transmission is computed from an hydraulic pressure exerted on a gear clutch and a friction coefficient and an entire surface area of the clutch engageable with each other. The two torque values are then compared with each other and if it is found that the engine torque exceeds the transmissible torque, the engine torque is restricted to the transmissible torque. As a result, a shock or jolting caused by clutch slippage occurred at gear shifting or the like can be avoided and unpleasantness resulted to the vehicle occupant and undue wear to the clutch plates are thus prevented.

6 Claims, 4 Drawing Sheets

SYSTEM FOR CONTROLLING AN INTERNAL COMBUSTION ENGINE FOR MOTOR VEHICLES EQUIPPED WITH AN AUTOMATIC TRANSMISSION

BACKGROUND OF THE INVENTION

1. Field of the Invention

This invention relates to a system for controlling an internal combustion engine for motor vehicles equipped with an automatic transmission and more particularly relates to such a system for controlling an automotive engine output power in such a manner as to reduce an unpleasant shock experienced by the vehicle occupant at gear shifting.

2. Description of the Prior Art

In motor vehicles equipped with an automatic transmission, several speed gears each having a multi-disc hydraulic clutch are selectively engaged in sequence in accordance with vehicle operating conditions including for instance a vehicle road speed and an opening degree of the throttle valve. More specifically, solenoid valves are provided in the hydraulic passage such that the electrohydraulic valves will drain pressurized oil from one clutch and apply the next one in sequence when a shift controller determines gear shifting in response to the aforesaid vehicle speed and the throttle valve opening. In order to ensure smooth shifting, the hydraulic pressure must be suitably controlled for the clutches concerned and if failed, the engine tends to race undesirably. Further, due to a sudden change in clutch slippage, it may happen to cause the vehicle occupant to feel an unpleasant shock, so-called "jolting". Namely, when said one clutch being drained its oil as aforementioned, the clutch will begin to disengage and to slip. Assume that a case is the downshifting. If the next lower gear brought into engagement late, the engine speed rises excessively in the meanwhile. The racing engine is then coupled to the next gear, which causes a shock similar to that happens in a situation where a vehicle is struck from behind. Alternatively, if the gear is engaged too fast, the engine speed, still remaining in a relatively low engine speed, will be suddenly pulled up to the speed of the lower gear, which generates another shock like braking. Those shocks are called as the jolting as aforementioned. Although such a shock may happen when the vehicle is equipped with a manually shifted transmission, it will be less serious in the kind of the vehicle, since the driver is able to be skilled enough for avoiding occurrence of the shock.

In view of the above, attempts have been made to control engine output power during shifting so as to reduce the shock. An example of one such system was given in U.S. Pat. No. 4,266,447. In the system disclosed, an engine control unit, upon receipt of a shift signal from the shift controller, kept to reduce the engine output power for a period which was determined on the engine speed at that instance. The conventional system, however, had a drawback that it was so complicated in system structure. That is, the shift signal had to be supplied from the shift controller to the unit, which required troublesome signal processing in the unit. Another and more serious problems encountered in the system was that, the power transfer in the transmission was not monitored when determining engine output control. And instead, the state was presumed outside the transmission through the engine speed, which disadvantageously led it difficult to cope with a sudden change in the power transmission. Furthermore, since the control was initiated in the conventional system only when the shift signal was transmitted from the shift controller, the system was unable to avoid a shock caused by clutch slippage due to a reason other than the gear shifting and was accordingly helpless in preventing the vehicle occupant from feeling discomfort and also ineffective in avoiding an undue wear to clutch plates resulting from the clutch slippage. The prior art system, thus, leaves much to be desired.

SUMMARY OF THE INVENTION

In view of the aforesaid shortcomings of the conventional system, it is an object of the invention to provide a system for controlling an internal combustion engine for motor vehicles equipped with an automatic transmission, wherein the power transfer in the transmission is directly monitored and based upon the ascertained power transfer state, an engine output power is suitably controlled.

Another object of the invention is to provide a system for controlling an internal combustion engine for motor vehicles equipped with an automatic transmission, wherein the shift signal is no longer needed for initiating the engine output power control and no signal processing accompanied thereto is therefore required such that the system structure and arrangements thereof are made extremely simple.

Still another object of the invention is to provide a system for controlling an internal combustion engine for motor vehicles equipped with an automatic transmission, which is able to cope with a clutch slippage caused by any reasons including shifting, which would otherwise results in unpleasant shock to the vehicle occupant and undue wear to clutch plates or the like.

Still further object of the invention is to provide a system for controlling an internal combustion engine for motor vehicles equipped with an automatic transmission, which is capable of save unnecessary energy consumption including fuel supplied to the engine.

For achieving the objects, the invention provides a system for controlling an internal combustion engine for motor vehicles equipped with an automatic transmission. In the system, there are provided first means for detecting an operating condition of the engine, second means for receiving an output signal of the first means to determine an output force generated by the engine at the detected operating condition, third means for detecting an operating condition of the transmission and fourth means for receiving an output signal of the third means to determine a transmissible force of the transmission. Control means is provided for receiving output signals of the second and fourth means, the control means including comparison means comparing the signals with each other and controlling the engine based upon the comparison result.

BRIEF DESCRIPTION OF THE DRAWINGS

These and other objects and advantages of the invention will be apparent as the description proceeds hereinbelow referring sometimes drawings accompanied herewith, wherein.

DESCRIPTION OF THE PREFERRED EMBODIMENTS

Figure 1:
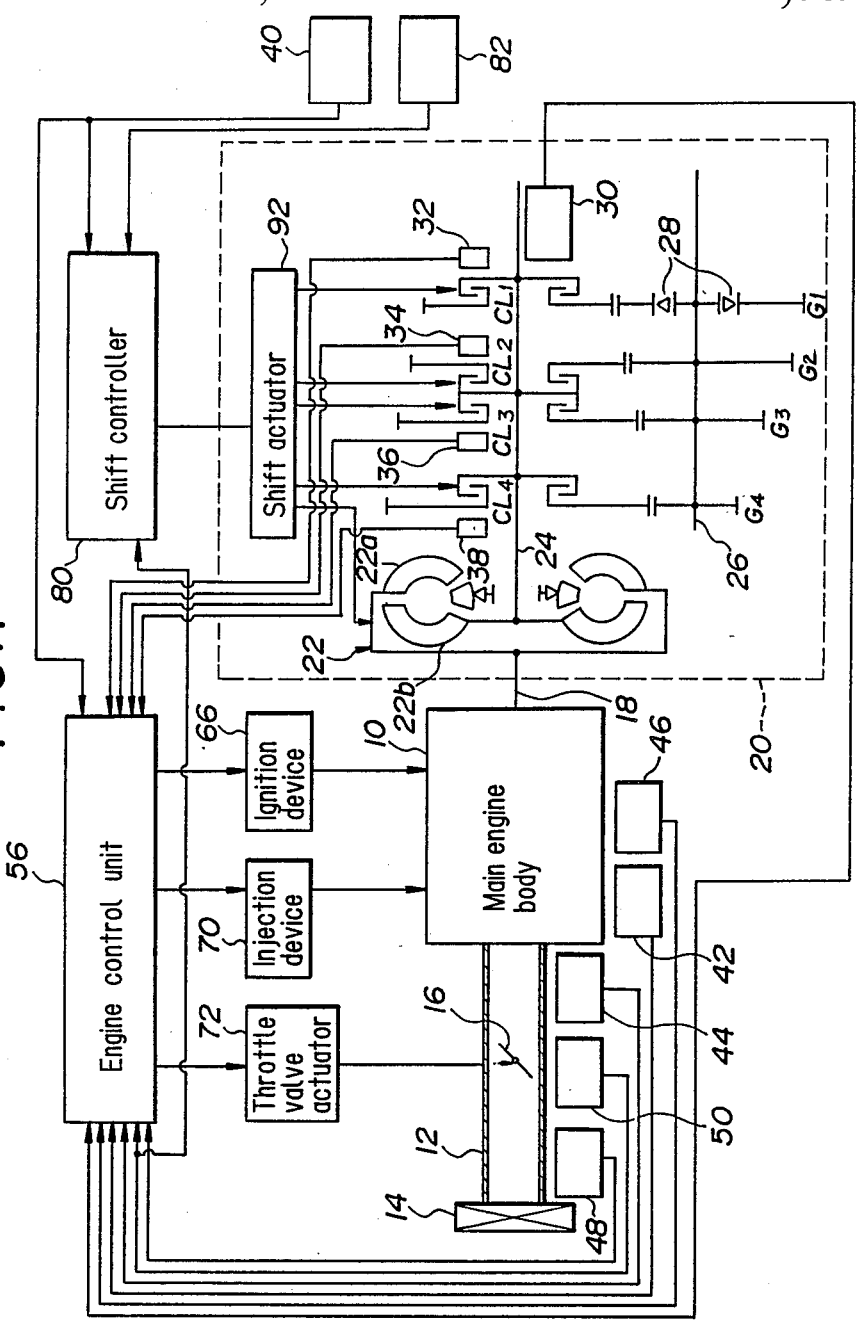
FIG. 1 is a schematic diagram showing overall structure of the control system according to the invention.

FIG. 1 is a schematic diagram of a control system according to the invention. In the drawing, the reference numeral 10 denotes a main engine body for motor vehicles. The main engine body 10 is connected with an air intake passage 12 having an air cleaner 14 attached to its far end. The flow rate of the intake air supplied to the engine via the air cleaner 14 and the air intake passage 12 is controlled by a throttle valve 16 which is in turn electronically connected to an accelerator pedal, not shown, located at the vehicle floor in the vicinity of the driver's seat. A fuel injection valve, not shown, for supplying fuel to the engine is provided at an appropriate portion of the air intake passage 12 in the vicinity of the combustion chamber, not shown, of the engine. The intake air mixed with the fuels enters the combustion chamber and after being compressed by a piston is ignited by a spark plug (neither shown). The fuel-air-mixture burns explosively and drives the piston. The driving force of the piston is converted into rotating motion which is made available at an engine output shaft 18.

The stage following the main engine body 10 is an automatic transmission 20. The output shaft 18 is connected with a torque converter 22 and is linked with its pump impeller 22a. A turbine runner 22b of the torque converter 22 is connected with a main shaft 24 (the transmission input shaft). A counter shaft 26, i.e. the transmission output shaft, is provided in parallel with the main shaft 24 and between the two shafts there are provided a 1st speed gear G1, a 2nd speed gear G2, a 3rd speed gear G3 and a 4th speed gear G4 and these gears are provided respectively with multi-disc clutches CL1, CL2, CL3 and CL4 all operable by a hydraulic pressure (the reverse gear and clutch are omitted from the drawing for simplicity). The 1st speed gear G1 is further provided with one-way clutch 28. A speed sensor 30 is provided in the proximity of the main shaft 24, which generates a signal at a predetermined angle of shaft rotation so as to indicate the revolution speed of the transmission input shaft. At appropriate locations of the hydraulic passage, not shown, connected to the clutches for supplying pressurized oil thereto, oil pressure sensors 32,34,36,38 are provided for detecting respectively the hydraulic pressure supplied to the clutches. Moreover, at an appropriate location near the transmission 20 there is provided a vehicle speed sensor 40, constituted as a reed switch or the like, for detecting the running speed of the vehicle. The sensor is also used for approximately measuring the revolution speed of the transmission output shaft 26, as will be explained at a later stage.

In the vicinity of a rotation member of the main engine body 10, e.g. a distributor or the like, there is provided a crankshaft angle sensor 42, constituted as an electromagnetic pickup or the like, which detects the position of the piston in terms of the crankshaft angular position and produces a signal once every prescribed number of degrees of crankshaft rotation. And, at an appropriate location near the air intake passage 12, a sensor 44 is provided to detect a load state of the engine through an absolute pressure of the drawn air. A sensor 46 is provided in a coolant water passage, not shown, of the engine for detecting its temperature and a similar sensor 48 is provided at an appropriate location at the air intake passage 12 for detecting a temperature of the air drawn into the engine. In the vicinity of the throttle valve 16 in the air intake passage 12, there is provided a throttle position sensor 50, constituted as a potentiometer or the like, for detecting a degree of opening of the throttle valve 16. The output signals of the sensors are sent to an engine control unit 56.

Figure 2:
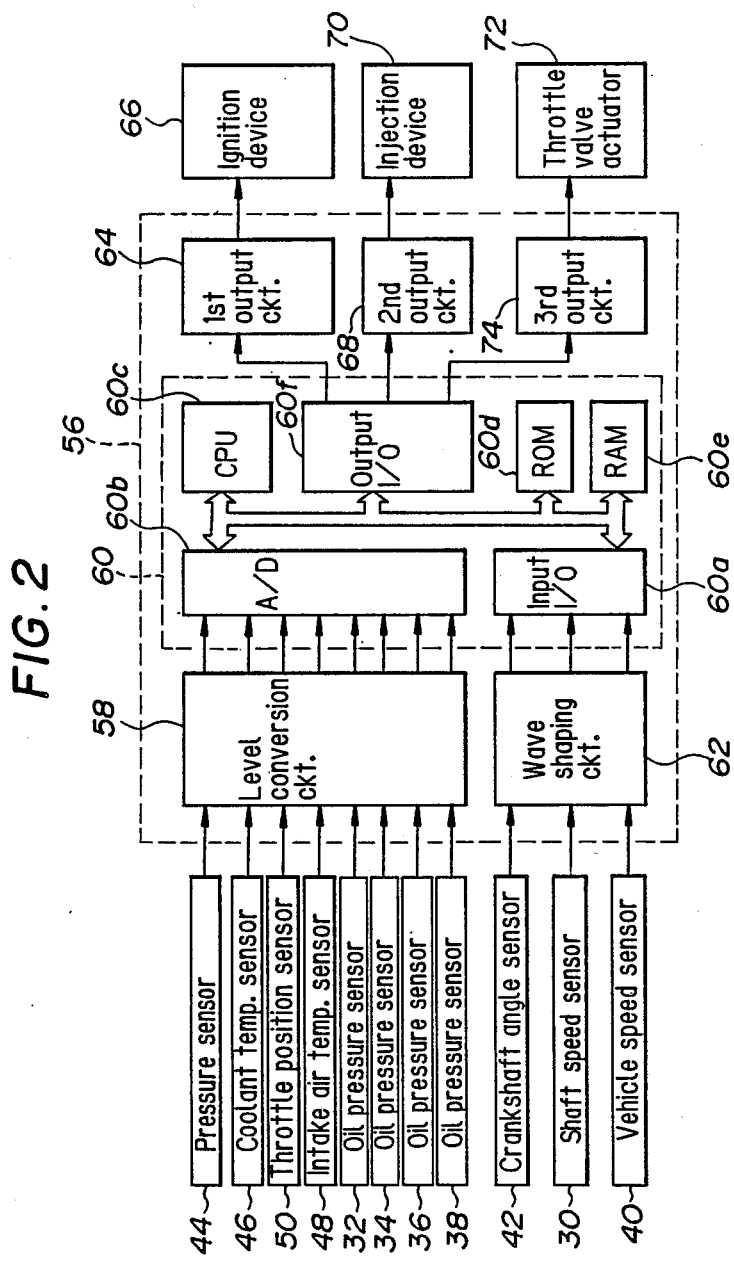
FIG. 2 is a block diagram showing an engine control unit shown in FIG. 1 in greater detail.

FIG. 2 is a block diagram showing the unit in detail. As shown in the figure, the output signals in analog form generated by the pressure sensor 44 etc. input to the unit is first sent to a level conversion circuit 58 where they are amplified to a suitable level and are forwarded to a microcomputer 60. The microcomputer has an input port 60a, an A/D converter 60b, a CPU 60c, a ROM 60d, a RAM 60e and an output port 60f. The outputs from the level conversion circuit 58 are input to the A/D converter 60b whereby they are converted into digital values and the digital values are temporarily stored in the RAM. The digital signal sent from the crankshaft angle sensor 42 and the like input to the unit are wave shaped in a wave shaping circuit 62 and then input to the microcomputer through the input port to be temporarily stored in the RAM. On the basis of these raw values and calculated data therefrom, the CPU determines a command value for controlling the engine operation including an ignition timing, a fuel injection and an opening degree of throttle valve. Briefly explaining these controls from the ignition timing, the CPU retrieves a mapped valve stored in the ROM using the engine speed and engine load as address data and determines a basic ignition timing. The CPU then adjusts the basic ignition timing by the coolant temperature and the like to determine an optimum ignition timing for the current engine operation, which is thereafter applied via a 1st output circuit 64 and an ignition device 66 including an igniter to the spark plug so as to fire the air-fuel-mixture in the engine combustion chamber. With reference to the fuel injection, the CPU similarly retrieves a mapped value to determine a basic fuel supply in terms of an injection valve opening period and after adding appropriate corrections, the CPU applies the adjusted values, via a 2nd output circuit 68, to an injection device 70 which eventually drives the injection valve by an appropriate pulse duty ratio to open it for the required period so as to supply the fuel in the chamber. As regards the throttle valve control, the throttle valve 16 is arranged to be operable independently of the accelerator pedal depression within a given engine operation range. The CPU can thus determine the opening degree when the engine operation is in the range and apply the command signal to a throttle valve actuator 72 via a 3rd output circuit 74. The actuator 72 includes a pulse motor connected to the throttle valve and a driver circuit therefor, neither shown, and drives the throttle valve 16 in the direction by the degree as required.

Referring again to FIG. 1, there is illustrated a shift controller 80 which controls the gear shifting occurred in the transmission 20. For the controller, a range selector switch 82 is provided for detecting a range selected by the driver. An output signal of the switch 82 as well as the aforesaid vehicle speed sensor 40 and the throttle position sensor 50 is sent to the shift controller 80.

Figure 3:
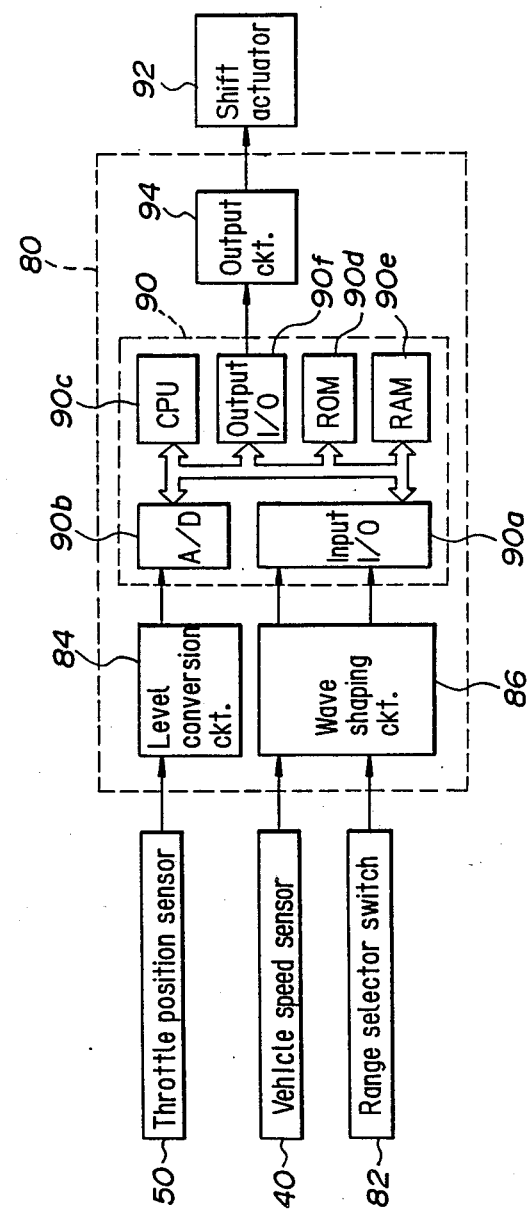
FIG. 3 is a block diagram, similar to FIG. 2 but shows a detailed structure of a shift controller shown in FIG. 1.

FIG. 3 shows the details of the shift controller 80 which is similar to the engine control unit 56 before mentioned. Namely, the output signals of the sensors 40, 50, 82 are forwarded to a level conversion circuit 84 or a wave shaping circuit 86, then input to a second microcomputer 90 via its input port 90a or an A/D converter 90b and are temporarily stored in a RAM 90e. In the microcomputer, a CPU 90c loads gear shift programs stored in a ROM 90d using the degree of throttle opening and the vehicle road speed as address data as is well known in the art and determines a gear to be shifted and instant of shifting. The determined command is then sent to a shift actuator 92 via an output port 90f and an output circuit 94. The actuator 92 has a circuit which, upon receipt of the shift signal, energizes/deenergizes magnetic solenoids for shift valves located in the hydraulic passage such that the electrohydraulic valve will drain pressurized oil from a clutch and apply the next one in sequence.

Figure 4:
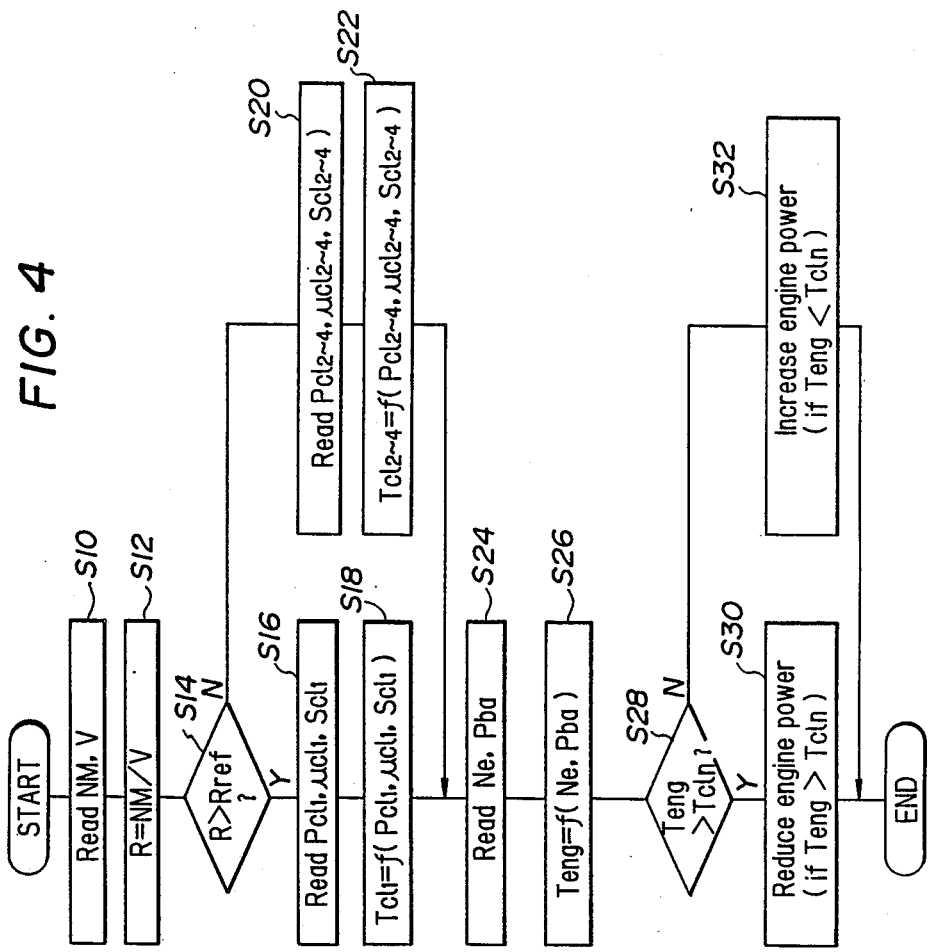
FIG. 4 is a flowchart showing an operation of the control system according to the invention.

Now referring to a flowchart shown in FIG. 4, a mode of operation of the system shall be explained hereinbelow. The program illustrated here is carried out by the engine control unit 56. That is, the unit repeatedly calculates the ignition timing etc. in sequence and is interrupted to initiate the program once per predetermined time interval such as 30 ms or once per a predetermined crankshaft angular position.

In the first step S10 of the flowchart, the transmission input shaft speed and the vehicle speed, here labeled as "NM" and "V" in the flow chart, are read out from the RAM and in the next step S12, the ratio R therebetween is calculated. As mentioned earlier, a speed sensor for detecting the transmission output shaft speed is omitted in the interest of structural simplicity and instead, the vehicle speed is used, after added by necessary conversion, for obtaining an approximate value of the transmission output shaft speed, since the vehicle road speed is nearly proportional to the output shaft speed. Therefore, the ratio R means;

Ratio R = transmission input shaft speed/transmission output shaft speed

The procedure goes thereafter to step S14 at which the ratio is compared with a predetermined reference value Rref so as to determine whether or not the current gear speed is the 1st. The reason why such a decision step is interposed here is that as will be explained later, the engine operation will be controlled by comparing a torque available from the engine with a torque transmissible in the transmission and for comparison, the transmissible torque is calculated from parameters including the hydraulic pressure exerted on a clutch or clutches being engaged at that instant. Since the one-way clutch 28 in the 1st speed gear always remains engaged even when the other speed gear is in operation and at such circumstance, the one-way clutch does play no role for the power transmission. For that purpose, the reference value Rref should be a value enough for being capable of discriminating whether or not the current speed gear is really the 1st. It is promised here that the reference value has been experimentally obtained and stored in the ROM.

When it is confirmed in step S14 that the ratio exceeds the reference value so that the current speed gear is the 1st, the procedure then advances to step S16 where the hydraulic pressure (kg/cm$^2$), labeled as "Pcl1", exerted on the 1st clutch CL1 is read out from the RAM. At the same time, a friction coefficient (labeled as "Mucl1") of the 1st clutch and an entire surface area (labeled as "Scl1") (cm$^2$) of the 1st clutch engageable with each other are read out from the ROM.

It is also promised here that the friction coefficient and the engageable surface area are predetermined date which have been obtained through experiments and stored in the memory. Based upon the data, at step S18 next, the torque transmissible through the 1st clutch, labeled as "Tcl1", is calculated as follows;

Tcl1 = f (Pcl1, Mucl1, Scl1) (kg·m)

The above mentioned "the torque transmissible through the 1st clutch" is used here as a value indicating a maximum torque the 1st clutch is able to transfer between the transmission input and output shafts. In other words, it may possibly be said that the torque will mean the maximum value of the torque against which the 1st clutch can bear or stand. The calculation of the torque Tcl1 has been experimentally obtained and stored in a memory. To be more specific, the friction coefficient Mucl1 and the engageable surface area Scl1 have been stored in a map in the ROM with respect to the hydraulic pressure Pcl1 such that the torque Tcl1 can be retrieved from the map using the measured pressure Pcl1 as address data.

When it is confirmed at step S14 that the current gear speed is not the 1st, the procedure goes to step S20 where the output signals of the oil pressure sensors for the other three clutches CL2, CL3, CL4 are read out from the RAM to determine similar hydraulic pressures Pcl2, Pcl3, Pcl4 for the clutches. Also, friction coefficients Mucl2, Mucl3, Mucl4 and engageable surface areas Scl2, Scl3, Scl4 for the three clutches are read out from the ROM. And next in step S22, transmissible torque Tcl2, Tcl3, Tcl4 are calculated in the same manner as was explained with reference to the 1st clutch. That is;

Tcl2-4 = f ( Pcl2-4, Mucl2-4, Scl2-4 ) (kg·m)

Since there may be a case where two clutches are engaged concurrently, the torque should be calculated for all three clutches and the resultant values will be summed up. To be explained more specifically, the measured pressure Pcl2, Pcl3, Pcl4 are respectively compared with a reference value and when any one among them exceeds the value, the clutch corresponding thereto is deemed to be in operation. Then the friction coefficient and engageable surface area for the clutch concerned are read out for the torque calculation. Next, in step S24, the engine speed Ne and the intake air pressure Pba are read out from the RAM to determine the current operating condition of the engine and in step S26, the torque Teng available from the determined engine condition is calculated as follows:

Teng = f (Ne, Pba)(kg·m)

It is similarly promised here that the calculation of the torque based upon the engine speed and the engine load have been experimentally obtained and stored in a map in the ROM such that it can be retrieved using the engine speed and load as address data, similarly as the calculation of the torque Tcln.

Next in step S28, the retrieved engine output torque Teng is compared with the aforesaid transmissible torque Tcln and if it is affirmed that the engine output torque Teng exceeds the transmissible torque Tcln, the procedure goes to step S30 where it is determined that engine power should be decreased such that the engine torque is equal to or less than the transmissible torque. On the other hand if the engine output torque is found to be less than the transmissible torque, the procedure advances to step s32 where the engine power is decided to increase until the engine torque reaches the transmissible torque. In order to adjust the engine power as determined, the ignition timing, the fuel injection and the opening degree of the throttle valve are controlled solely or in combination. For example, when the ignition timing is to be controlled, the ignition timing will be retarded by a given amount and thereafter restored in the advancing direction when engine power increase is determined. The retard amount may be varied depending upon a deviation between the torque Teng and the torque Tcln or may be fixed to a constant value. An advancing amount will be decided similarly. Alternatively, when the throttle valve is to be controlled, the throttle valve will be driven in the closing direction for engine power reduction or driven in the opening direction for power increase by an amount determined similarly as that in the ignition timing. The fuel injection will be used for the same purpose. At that instance, the injection period will be shortened for the power reduction and vice versa. Fuel may be alternatively cut for the power reduction.

It should be noted that in the flowchart the engine power is restricted to the extent that the transmission is able to transfer to the vehicle wheels. In other words, the calculation steps for the torque Tcln (S10–S22) are assigned a priority over those for the torque Teng (S24–S26) in the flowchart. Hence, any clutch slippage will no longer cause any inconvenience both to the vehicle occupant and clutch component. Furthermore, since the shift signal from the shift controller is no longer needed, the system structure can thus be simplified and any shock resulting from a reason other than the shifting can be avoided. Unnecessary energy consumption including fuel supplied to the engine is effectively reduced.

The present invention has thus been shown and described with reference to the specific embodiments. However, it should be noted that the present invention is in no way limited to the details of the described arrangements but changes and modifications may be made on any system included in the power train of the motor vehicle without departing from the scope of the appended claims.

What is claimed is:

1. A system for controlling an internal combustion engine for motor vehicles equipped with an automatic transmission, comprising;
   first means for detecting an operating condition of the engine;
   second means for receiving an output signal of the first means to determine an output force generated by the engine at the detected operating condition;
   third means for detecting an operating condition of the transmission;
   fourth means for receiving an output signal of the third means to determine a transmissible force of the transmission; and
   control means for receiving output signals of the second and fourth means, the control means including comparison means comparing the signals with each other and controlling the engine based upon the comparison result.

2. A system according to claim 1, wherein said control means controls the engine such that the output force generated by the engine is always not more than the transmissible force of the transmission.

3. A system according to claim 2, wherein said first means detects said engine operating condition through at least an engine speed and an engine load.

4. A system according to claim 2, wherein said automatic transmission is provided with a clutch operable by a hydraulic pressure and said third means detects said transmission operating condition through at least the hydraulic pressure exerted on the clutch and a friction coefficient and an entire surface area of the clutch engageable with each other.

5. A system according to claim 2, wherein said control means assigns a priority to said output signal of the fourth means over that of said second means.

6. A system according to claim 2, wherein said control means controls the engine operation through, soley or in combination, an ignition timing, a fuel injection and an opening degree of a throttle valve.

* * * * *